(12) United States Patent
Wei et al.

(10) Patent No.: US 12,179,268 B2
(45) Date of Patent: Dec. 31, 2024

(54) DYNAMIC SLICING METHOD FOR ADDITIVE MANUFACTURING FORMING WITH VARIABLE FORMING DIRECTION

(71) Applicant: XI'AN JIAOTONG UNIVERSITY, Shaanxi (CN)

(72) Inventors: Zhengying Wei, Shaanxi (CN); Xuhui Lai, Shaanxi (CN); Huanqing Yang, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 439 days.

(21) Appl. No.: 17/547,258

(22) Filed: Dec. 10, 2021

(65) Prior Publication Data

US 2022/0100170 A1 Mar. 31, 2022

Related U.S. Application Data

(63) Continuation of application No. PCT/CN2020/093270, filed on May 29, 2020.

(30) Foreign Application Priority Data

Jun. 13, 2019 (CN) .......................... 201910512628.2

(51) Int. Cl.
  *B22F 10/28* (2021.01)
  *B22F 10/80* (2021.01)
  *G05B 19/4099* (2006.01)

(52) U.S. Cl.
  CPC ............. *B22F 10/28* (2021.01); *B22F 10/80* (2021.01); *G05B 19/4099* (2013.01); *G05B 2219/49023* (2013.01)

(58) Field of Classification Search
  CPC .......... B22F 10/28; B22F 10/80; B22F 10/00; G05B 19/4099; G05B 2219/49023;
  (Continued)

(56) References Cited

U.S. PATENT DOCUMENTS 6,214,279 B1 * 4/2001 Yang ..................... B29C 64/165
  264/494
10,137,646 B2 * 11/2018 Stevens ................. B29C 64/386
  (Continued)

FOREIGN PATENT DOCUMENTS

CN   102938165 A   2/2013
CN   103761397 A   4/2014
  (Continued)

*Primary Examiner* — Chun Cao
*Assistant Examiner* — Michael Tang
(74) *Attorney, Agent, or Firm* — Nitin Kaushik

(57) ABSTRACT

An EBM variable-direction formation dynamic slicing method in cooperation with an 840D digital control system includes: creating a vertex array object, adjusting a projection matrix to a slice height, outputting a binary image of a two-dimensional cross-section; obtaining, by means of two-dimensional contour extraction, data of a contour line from the binary image, outputting coordinates of a closed contour, and connecting all adjacent coordinates into a straight line to form a closed curve; when a triangle tolerance is 1, dividing contour data into a straight line part and a curve part by taking a starting point of small straight lines with an angle of 140° therebetween as a dividing point, removing adjacent points, repeated points and internal points of a same straight line, and performing segmentation fitting on curve parts of the slice data, and then performing dynamic slicing through the 840D numerical control system.

9 Claims, 4 Drawing Sheets

(58) Field of Classification Search
CPC ....... G05B 2219/49007; G06F 2113/10; G06F 30/10; B33Y 50/00; Y02P 10/25; G06T 7/12; G06T 7/13; G06T 17/00
USPC ......................................................... 700/118
See application file for complete search history.

(56) References Cited

U.S. PATENT DOCUMENTS

| | | | | |
|---|---|---|---|---|
| 2011/0109629 | A1* | 5/2011 | Ericson | H04N 13/275 345/426 |
| 2013/0009338 | A1 | 1/2013 | Mayer | |
| 2018/0310907 | A1* | 11/2018 | Zhang | G06F 3/0346 |
| 2021/0107231 | A1* | 4/2021 | Yao | G06T 17/20 |

FOREIGN PATENT DOCUMENTS

| | | | |
|---|---|---|---|
| CN | 104626585 | A | 5/2015 |
| CN | 105121134 | A | 12/2015 |
| CN | 109228353 | A | 1/2019 |
| CN | 109685914 | A | 4/2019 |
| CN | 110355365 | A | 10/2019 |
| EP | 2930694 | A2 | 10/2015 |
| EP | 3219472 | A1 | 9/2017 |

* cited by examiner

DYNAMIC SLICING METHOD FOR ADDITIVE MANUFACTURING FORMING WITH VARIABLE FORMING DIRECTION

CROSS-REFERENCE TO RELATED APPLICATION

The present application is a continuation of International Application No. PCT/CN2020/093270, filed on May 29, 2020, which is filed based on and claims a priority to Chinese patent Application No. 201910512628.2, filed on Jun. 13, 2019, the entire disclosure of which are hereby incorporated herein by reference.

TECHNICAL FIELD

The present disclosure belongs to a technical field of rapid formation, and particularly relates to an EBM variable-direction formation dynamic slicing method in cooperation with an 840D numerical control system.

BACKGROUND

Electron beam additive manufacturing (EBM) has been widely applied in rapid manufacturing of precision blanks in an aerospace field, but the following problems still exist.

(1) The traditional formation method is to slice an STL file in accordance with a specified height before processing. It is difficult to adjust a slice height according to an actual thickness. The main limitation is that slicing of a single layer takes too much time, which easily destroys a formation step.

(2) Direct slicing of the STL file produces too many small straight lines, and the motor may frequently start and stop during a formation process, resulting "jittering" of an electron gun.

(3) When a curvature of a curve is large, the formation method of micro-straight approximation will produce a phenomenon of metal over-stacking at an inflection point, as illustrated in FIG. 2, resulting in that the formation cannot continue.

(4) The traditional 3-axis machine tool cannot be adjusted to a formation posture according to a variation of the curvature of a model. For transition parts of large curvature or overhanging parts, additional support design needs to be added. However, in EBM formation, energy input is extremely large and a width of a single-pass molten pool is about 5 mm, resulting in that a support structure cannot be easily removed, so it is not suitable for adding support.

(5) Since concave and convex contours on a surface of a formation layer are mostly curves or curved surfaces, even if a precision 5-axis machine tool is used to ensure a constant distance between the electron gun and a current formation layer, linkage coordination with more than 3 axes is required.

SUMMARY

The technical problem to be solved by the present disclosure is to provide an EBM variable-direction formation dynamic slicing method in cooperation with an 840D numerical control system in view of the above-mentioned deficiencies in the related art, which improves a slicing speed, achieves a dynamic adjustment of a layer thickness during a formation process, and simultaneously fits contour data, to ensure a constant line speed, reduce excessive accumulation of metal, and avoid a use of a support structure by combining a posture adjustment of a numerical control system.

The present disclosure adopts following technical solutions.

An EBM variable-direction formation dynamic slicing method in cooperation with an 840D numerical control system. The method includes:

step S1: loading an STL file, creating a vertex array object (VAO), turning on a template buffer, adjusting a projection matrix to a slice height in rendering of a three-dimensional (3D) model, traversing all pixels in a field of view sequentially by determining an intersection between a viewpoint and a voxel using a reverse ray tracing algorithm, reading image data from pixels at a set height, and outputting a binary image of a two-dimensional cross-section;

step S2: obtaining, by means of two-dimensional contour extraction, data of a contour line from the binary image obtained in the step S1, outputting coordinates of a closed contour, and connecting all adjacent coordinates into a straight line in such a manner that respective straight lines are connected end to end to form a closed curve; and step S3: when a triangle tolerance is 1, dividing contour data into a straight line part and a curve part by taking a starting point of small straight lines with an angle of 140° therebetween as a dividing point, removing adjacent points, repeated points and internal points of a same straight line, and performing segmentation fitting on curve parts of the slice data by using a NURBS curve, and then performing dynamic slicing through the 840D numerical control system.

Specifically, the step S1 includes: determining whether a ray directed to a pixel from the viewpoint intersects with a 3D grid based on a positional relation between an STL grid and any coordinate point x in space, a ray r(d) emitted from a camera position and a plane equation of any triangle grid in space, and traversing all pixels in the field of view sequentially to obtain the binary image of the 3D model at a specified height.

Further, when using the reverse ray tracing algorithm, the positional relation between the STL grid and any coordinate point x in space is expressed as:

$$f(x) = \begin{cases} -1 & \text{the coordinate point is outside the model} \\ 0 & \text{the coordinate point is on the model} \\ 1 & \text{the coordinate point is inside the model} \end{cases};$$

the ray r(d) emitted from the camera position is:

$$r(d) = c + dn,$$

where d>0, d denotes a ray distance, and c denotes coordinates of the camera position; and
the plane equation of any triangle grid in space is:

$$[r(d) - o] \cdot N = 0,$$

where o denotes coordinates of the triangle grid, and N is a normal vector of the triangle grid.

Specifically, the step S1 includes: performing 3D slicing by using the template buffer of OpenGL, and rendering the model three times by means of ray tracing, including: a value of f(x) being +1 when an external grid is encountered, the value of f(x) being −1 when the internal grid is encountered, and deleting an area with a value of 0 in a buffer.

Specifically, in the step S2, the contour extraction includes:

S201: storing coordinates and marks of a position into a specific array;

S202: extracting a block from the grid as a currently active block and obtaining coordinates and bump information of four grid points; and S203: setting adjacent coordinates after searching as $p_1(x_1, y_1)$ and $p_2(x_2, y_2)$, performing an interpolation correction on a sequence of coordinates with a midpoint as an intersection point to obtain an interpolation point $p(x, y)$, and completing the contour extraction.

Further, the interpolation point $p(x, y)$ is:

$$y = y_1 + \frac{y_2 - y_1}{x_2 - x_1}(x - x_1).$$

Specifically, at step S3, a BSPLINE interpolation function of an SINUMERIK 840D SL smoothly connect scattered coordinate points through control points and weight factors (BSPLINE X10Y10 PW=0.5), and a linear velocity is always constant during a formation process, contour coordinate points generated by the slicing are set as $\{V_k\}$, $k=0, 1, \ldots, n$, a node vector $U=\{u_0, u_1, \ldots, u_m\}$, a node corresponding to any coordinate point $V_k$ is $\bar{u}_k$, n+1 linear equations are constructed according to n coordinate points; data points are parameterized with centripetal parameterization method; fitting is performed by using a cubic spline curve.

Further, the n+1 linear equations are as follows:

$$V_k = S(\bar{u}_k) = \sum_{i=0}^{n} N_{i,p}(\bar{u}_k) C_i,$$

where the control point $C_i$ is a quantity to be determined, and the node value $\bar{u}_k$ is within [0,1]; the data points are parameterized as:

$$\bar{u}_k = \bar{u}_{k-1} + \frac{\sqrt{|V_k - V_{k-1}|}}{\sum_{k=1}^{n} \sqrt{|V_k - V_{k-1}|}},$$

where $k=1, 2, \ldots, n-1$, $\bar{u}_0=0$, and $\bar{u}_n=0$;

in order to ensure that tangents of curves on both sides of the dividing point are collinear, first-order derivative vectors at endpoints are respectively set as $F_0$ and $F_n$, and a repeatability of the curve at the endpoints is 3:

$$u_{j+d} = \bar{u}_j,$$

where $j=1, 2, \ldots, n-p$, $\bar{u}_0 = \ldots = \bar{u}_3 = 0$, and $\bar{u}_{n+1} = \ldots = \bar{u}_{n+6} = 1$;

an equation of endpoints of the curve and a first-order derivative vector equation controlling a direction of the curve are:

$$\begin{cases} C_0 = V_0 \\ -C_0 + C_1 = \frac{u_4}{3} F_0 \\ -C_{n+1} + C_{n+2} = \frac{1 - u_{n+2}}{3} F_n \\ C_{n+2} = V_n \end{cases},$$

except for the endpoints, a repeatability of each internal node is 1, and at most three non-zero basis functions are provided for node uj; and n−1 equations excluding the endpoints are:

$$V_k = N_{k,3}(\bar{u}_k) C_k + N_{k+1,3}(\bar{u}_k) C_{k+1} + N_{k+2,3}(\bar{u}_k) C_{k+2},$$

where $k=1, 2, \ldots, n-1$, $a_k = N_{k,3}(\bar{u}_k)$, $b_k = N_{k+1,3}(\bar{u}_k)$, $c_k = N_{k+2,3}(\bar{u}_k)$ and a linear equation set with a coefficient of $(n-1) \times (n-1)$ is calculated as follows:

$$\begin{bmatrix} V_1 - a_1 C_1 \\ V_2 \\ \vdots \\ V_{n-2} \\ V_{n-1} - c_{n-1} C_{n-1} \end{bmatrix} = \begin{bmatrix} b_1 & c_1 & 0 & \ldots & 0 & 0 & 0 \\ a_2 & b_2 & c_2 & \ldots & 0 & 0 & 0 \\ \vdots & \vdots & \vdots & & \vdots & \vdots & :0 \\ 0 & 0 & 0 & \ldots & a_{n-2} & b_{n-2} & c_{n-2} \\ 0 & 0 & 0 & \ldots & 0 & a_{n-1} & b_{n-1} \end{bmatrix} \begin{bmatrix} C_2 \\ C_3 \\ \vdots \\ C_{n-1} \\ C_n \end{bmatrix}.$$

Specifically, after the fitting in the step S3 is completed, an angle of a worktable of the 840D numerical control system is adjusted based on a formation direction of each feature of the model; a first motor, a third motor and a fifth motor of the 840D numerical control system are linked to complete spatial curve formation; the first motor moves by rotating and a second motor of the 840D numerical control system moves in a straight line to work in cooperation with each other, to form a straight line, a full circle, an arc and an Archimedes spiral in the plane, for use in contour approximation fitting, island profile filling, full circle formation, straight line formation, arc formation during curve formation; and a quick response is made to a setting of dry elongation, a distance between a formation plane and an electron gun is dynamically adjusted, the slicing is performed.

Further, when an axis of a solid model after feature decomposition is a straight line, slicing is performed along the axis of each feature during a slicing process; after slicing in a direction of one feature is completed, the fifth motor is rotated by 90° for formation of a next feature; when the axis of the model after feature decomposition is a curve, the model is rotated 180 times by 180 degrees in an increment of δ=1°, and a minimum bounding box is calculated for each time; a position with a smallest box volume is the best placement position for the model; a surface P3 with a smallest area in the bounding box is used as an initial slicing surface, taking a longest side as a slicing direction and a surface with a largest area as a test slicing plane P1; a curvature change of a slice contour obtained by cutting the model along P1 is used as an adjustment basis for a change of the slicing direction; during the slicing process, an angle θ between a slope of the curve and a Z axis is calculated based on a set slice thickness; and the model is cut along the slicing direction after being rotated to the angle θ each time.

In variable-direction formation, the fifth motor gradually rotates following a change of a curvature, in such a manner that a formation plane is always parallel to the worktable; when an actual formation surface has a contour having ups and downs, the fifth motor is configured to swing left and right in accordance with fed back data on a position of the electron gun, in such a manner that a distance between the electron gun and a workpiece is stable at all times; and then, the fifth motor, the first motor and the third motor move in cooperation with each other to form a spatial curve, which changes following a contour of a surface of a molten pool.

Compared with the related art, the present disclosure has at least the following beneficial effects.

The EBM variable-direction formation dynamic slicing method in cooperation with the 840D numerical control system according to the present disclosure may avoid a design of a support structure of an overhanging structure or a large curvature part in the formation process; improve a slicing speed, and complete data update in a processing gap between two formation layers; fit the slice data to ensure a stable formation process and achieve a rapid response of the numerical control system to the slice data.

Further, it is determined whether the ray emitted from the camera position has an intersecting relation with the triangle grid, where 1 denotes invisible, and 0 denotes visible.

Further, according to visibility of the triangle grid, colors of all voxels are marked with (0, 0, 0) and (255, 255, 255), and RGB values are written into a color buffer to output a binary image.

Further, an MS search algorithm uses a grid vertex as an intersection of a pixel and the model, but in fact the model mostly intersects with the edge of the pixel. The extracted coordinate data is optimized by means of interpolation to result in a natural contour transition.

Further, contour data extracted from a binary image is fitted by using a NURBS curve, and transformed to a curve processing command of the numerical control system to ensure a constant linear speed during the formation process, avoid a frequent start and stop of a motor, reduce a phenomenon of metal over-stacking, and improve a formability of the model.

Further, the hardware structure may not only adjust a formation posture in coordination with the direction of the model during the formation process, but also continuously adjust a height of the electron gun in an interpolation mode of a 3D spiral based on feedback information of an actual layer thickness.

Further, an angle of a worktable is adjusted based on a decomposition direction of the model to ensure that an actual formation plane is absolutely horizontal and improve the formability of the model.

In summary, the present disclosure may load voxel information in parallel by using a GPU slicing algorithm, which may significantly reduce calculation time when a large number of triangle grids is provided. The present disclosure may adjust a projection matrix to the slice height in rendering of the 3D model, and output the binary image of the two-dimensional cross-section by determining the intersection between the viewpoint and the voxel. The present disclosure may output coordinates of the closed contour by using an MS algorithm. The present disclosure may perform segmentation fitting on the slice data by using a spline basis function. The present disclosure reduces a conversion error of an STL file, and at the same time reduces a phenomenon of over-stacking of an inflection point of the straight line.

The technical solutions of the present disclosure will be further described in detail below through accompanying drawings and embodiments.

BRIEF DESCRIPTION OF DRAWINGS

FIGS. 3A and 3B are schematic diagrams illustrating a hardware structure according to the present disclosure, in which FIG. 3A is a perspective view and FIG. 3B is a side view;

FIG. 5A illustrates an original cut line and contour fitting, (b) illustrates an approximation error of slice data and fitting data;

FIG. 6A illustrates a straight axis and FIG. 6B illustrates a curved axis;

Figure 1:
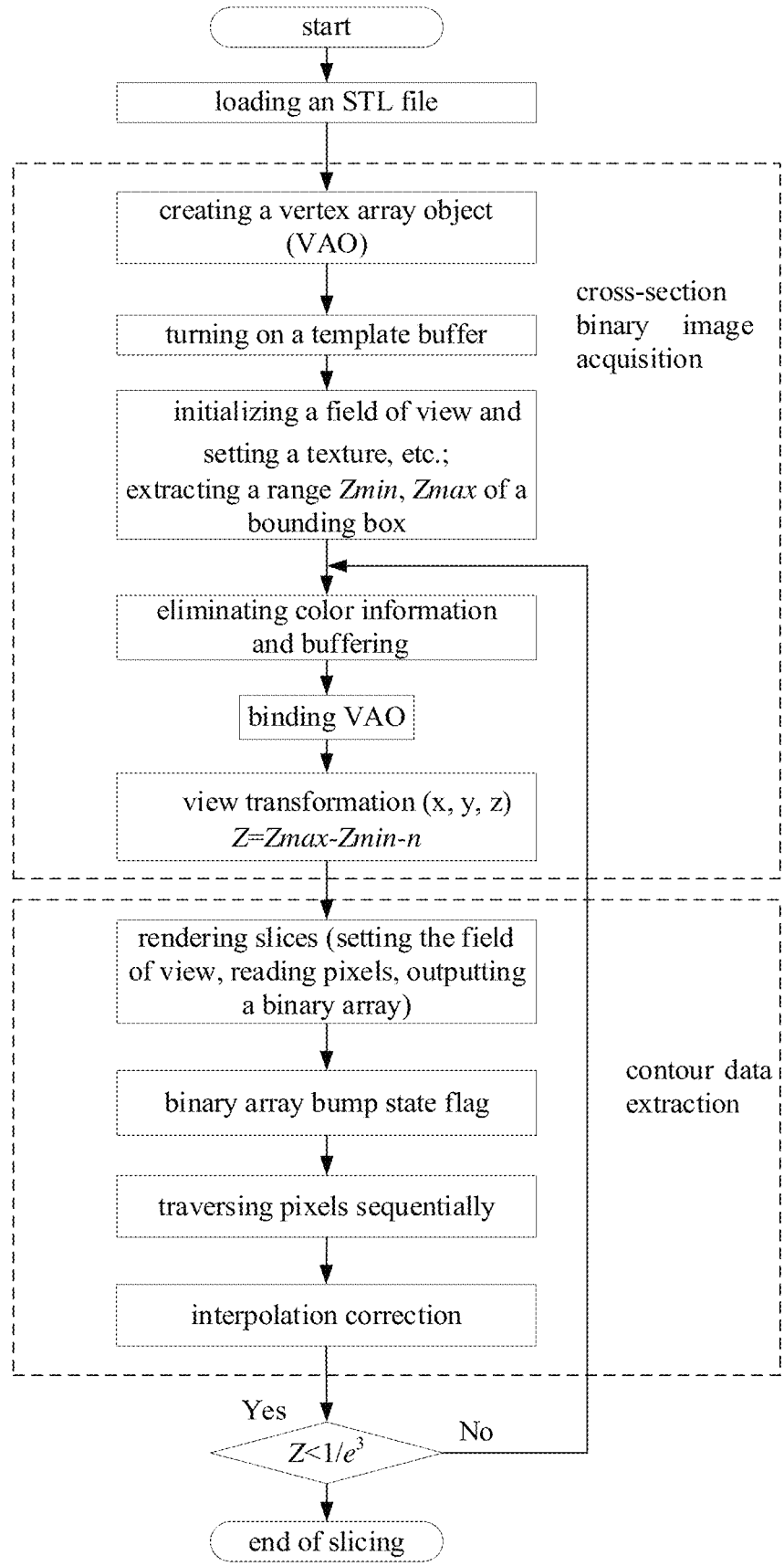
FIG. 1 is a flowchart illustrating GPU slicing according to the present disclosure.

In the drawings, 1 denotes a first motor, 2 denotes a second motor, 3 denotes a third motor, 4 denotes a fourth motor, 5 denotes a fifth motor, 6 denotes a turntable, and 7 denotes a worktable.

DESCRIPTION OF EMBODIMENTS

The present disclosure provides an EBM variable-direction formation dynamic slicing method in cooperation with an 840D numerical control system. An STL file is sliced by using a parallel computing technology of a graphics card to improve a data acquisition speed. During a time gap between an end of formation of a previous layer and a beginning of formation of a next layer, a layer thickness or a formation posture is adjusted according to feedback data, without affecting a processing pace. A rotation movement of a base plate provided with hardware may reduce or avoid a use of a support.

Referring to FIG. 1, the EBM variable-direction formation dynamic slicing method in cooperation with the 840D numerical control system according to the present disclosure includes the following steps.

Figure 8:
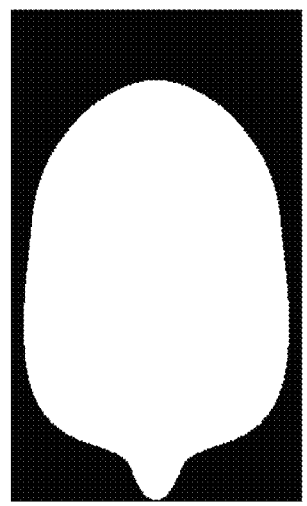
FIG. 8 illustrates a binary image of the cross-sectional profile.

At step S1, voxel information is loaded in parallel by using a GPU slicing algorithm. When the number of triangle grids is large, calculation time is reduced, a vertex array object (VAO) is created, a template buffer is turned on, a projection matrix is adjusted to a slice height in rendering of a 3D model, image data is read from pixels at a set height by determining an intersection between a viewpoint and a voxel using a reverse ray tracing algorithm, and a binary image of a cross-section is outputted, as illustrated in FIG. 8.

Unlike object lighting, a light of the reverse ray tracing algorithm is emitted from a position of a camera. A light intensity and color at an intersection of the light and the model are tracked and mapped to the corresponding voxel. It is mainly used for a model rendering. The whole process needs to iterate repeatedly along a direction of refraction or reflection of the light until the light intensity is small than a set value or the calculation ends when it is projected into an environment. In an acquisition of a cross-section of a contour, it is only necessary to consider whether there is a model at the corresponding voxel, which has nothing to do with information such as color and texture. Therefore, the refraction and reflection of the light are not considered in the calculation process. When the light intersects the model, the corresponding voxel (pixel) is set to black, otherwise white. In order to ensure an accuracy of contour extraction, a field of view is initialized according to requirements for accuracy of the light during the formation process.

When the reverse ray tracing algorithm is used, the positional relation between the STL grid and any coordinate point x in space is expressed as:

$$f(x) = \begin{cases} -1 & \text{the coordinate point is outside the model} \\ 0 & \text{the coordinate point is on the model} \\ 1 & \text{the coordinate point is inside the model} \end{cases} ;$$

the ray r(d) emitted from the camera position is:

$$r(d)=c+dn,$$

where d>0, d denotes a ray distance, and c denotes coordinates of the camera position; and
the plane equation of any triangle grid in space is:

$$[r(d)-o)]\cdot N=0,$$

where o denotes coordinates of the triangle grid, and N is a normal vector of the triangle grid.

Through the above three calculation formulas, it can be determined whether the ray directed to the pixel from a viewpoint intersects with the 3D grid, and all pixels are traversed in the field of view sequentially to obtain the binary image of the model at a specified height. The present disclosure is not limited to the 3D model of a triangle grid type, and the contour of the model may be obtained, as long as the intersection with the light may be obtained.

Due to a large size of the formed part, an electron beam formation is often combined with a numerical control system. The traditional STL slicing produces a large amount of data. A motor frequently accelerates and decelerates during the formation process, which is prone to a "knife shaking" phenomenon. So, it is needed to perform quadratic fitting on the contour data, and in combination with processing commands of the B-spline curve or high-order curve of the numerical control system, a constant line speed during a curve processing can be ensured while reducing the amount of G code transmission.

A dynamic high-speed acquisition of the two-dimensional cross-section specifically includes the following steps.

The dynamic adjustment of the layer thickness and the posture needs to quickly calculate a filling method of a lower layer or even re-extract the contour data at the specified height before a subsequent processing starts. GPU rendering acceleration and parallel computing provide a possibility of stable and reliable implementation of this method.

3D slicing is performed by using the template buffer of OpenGL, and the model is rendered three times by means of ray tracing:

(1) adding one to a value of f(x) when an external grid is encountered;
(2) subtracting one from the value of f(x) when the internal grid is encountered; and
(3) deleting an area with a value of 0 in a buffer.

At step S2, data of the contour line is obtained from the image by using an MS (Marching Square 2D contour extraction) method, coordinates of a closed contour are outputted, and all adjacent coordinates are connected into a straight line in such a manner that respective straight lines are connected end to end to form a closed curve.

The contour extraction includes the following steps.

(1) Coordinates and marks of a position are stored into a specific array.
(2) A block is extracted from the grid as a currently active block and coordinates and bump information of four grid points are obtained.
(3) Adjacent coordinates after searching are set as $p_1(x_1, y_1)$ and $p_2(x_2, y_2)$, an interpolation correction is performed on a sequence of coordinates with a midpoint as an intersection point to obtain an interpolation point p(x, y), and the interpolation point p(x, y) is:

$$y = y_1 + \frac{y_2 - y_1}{x_2 - x_1}(x - x_1)$$

At step S3, when the triangle tolerance is 1, the slice data is fitted by the spline basis function, a conversion error of the STL file is reduced by 29% by using NURBS curve fitting, and the phenomenon of over-stacking of the straight line inflection point is reduced.

Figure 5A:
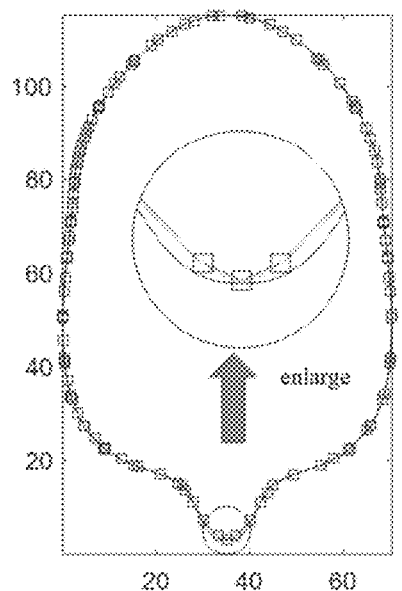
FIGS. 5A and 5B illustrate a comparison of fitting effects and an error distribution, where
Figure 5B:
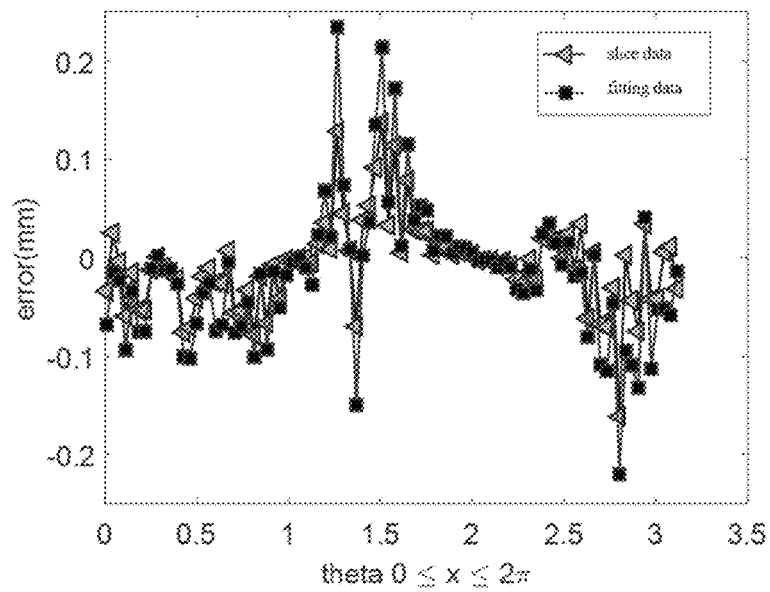

When the STL file is derived from the 3D model, an original surface is approximated by using the triangle grid. A tolerance of 1 mm denotes that a maximum distance between all the triangle grids and the surface is not larger than 1 mm. If a straight line is used for connection to form the contour, the error is not larger than 1 mm. When using the NURBS curve fitting, the convex or concave effect may appear between two points in accordance with a change trend of a previous point, so fitted data will be closer to the original data, and the error is reduced as illustrated in FIGS. 5A and 5B.

When a broken-line contour is processed, each straight line will go through a process of "acceleration-uniform motion-deceleration", so a speed at a corner is reduced to 0, which leads to metal over-stacking. A linear velocity is always constant after the curve fitting, so an amount of metal fed into a molten pool per unit time is also constant.

NURBS Contour Fitting

Figure 2:
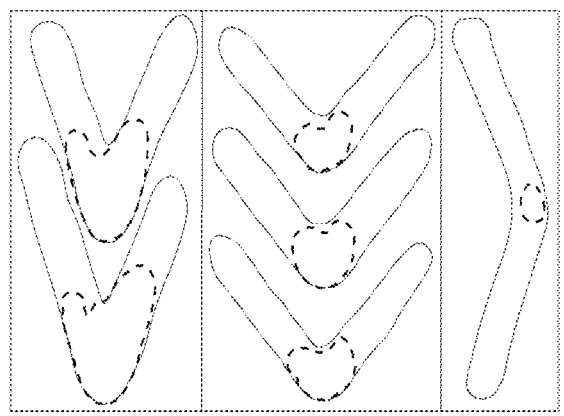
FIG. 2 is a schematic diagram illustrating angled formation.

The contour produced by the STL slicing is composed of a large number of micro-segmented straight lines, and there are angles between small straight lines. The decrease in the speed of the inflection point during the formation process leads to an increase in the amount of metal fed into the molten pool per unit time. As an included angle decreases, the phenomenon of over-stacking becomes more and more serious, as illustrated in FIG. 2. It is found through experiments that when a straight-line included angle is greater than 140°, the phenomenon of over-stacking is significantly ameliorated. Therefore, the contour data is divided into a straight line part and a curve part by taking a starting point of small straight lines with an angle of 140° therebetween as a dividing point, adjacent points, repeated points and internal points of a same straight line are removed, and the NURBS curve fitting is performed on curve parts to reduce the number of starts and stops of the motor and ensure the constant line speed.

A BSPLINE interpolation function of an SINUMERIK 840D SL smoothly connect scattered coordinate points through control points and weight factors (BSPLINE X10Y10 PW=0.5), and a linear velocity is always constant during a formation process, contour coordinate points generated by the slicing are set as $\{V_k\}$, k=0, 1, . . . , n, a node vector U=$\{u_0, u_1, \ldots, u_m\}$, a node corresponding to any coordinate point $V_k$ is $\bar{u}_k$, n+1 linear equations are constructed according to n coordinate points. The n+1 linear equations are as follows:

$$V_k = S(\bar{u}_k) = \sum_{i=0}^{n} N_{i,p}(\bar{u}_k)C_i,$$

where the control point $C_i$ is a quantity to be determined, and the node value $\bar{u}_k$ is within [0,1].

Additive manufacturing is mainly used to manufacture parts that cannot be processed or difficult to be processed by conventional methods. Most models contain complex curves and surfaces. In the slice data, a proportion of sharp points of $C^0$ continuous or data points of large curvature transition is high, so a centripetal parameterization method is used to parameterize data points:

$$\overline{u}_k = \overline{u}_{k-1} + \frac{\sqrt{|V_k - V_{k-1}|}}{\sum_{k=1}^{n}\sqrt{|V_k - V_{k-1}|}},$$

where k=1, 2, . . . , n−1, $\overline{u}_0$=0, and $\overline{u}_n$=0.

In order to ensure that tangents of curves on both sides of the dividing point are collinear, first-order derivative vectors at endpoints are respectively set as $F_0$ and $F_n$, and a repeatability of the curve at the endpoints is 3:

$$u_{j+d} = \overline{u}_j,$$

where j=1, 2, . . . , n−p, $\overline{u}_0$= . . . =$\overline{u}_3$=0, and $\overline{u}_{n+1}$= . . . = $\overline{u}_{n+6}$=1.

An equation of endpoints of the curve and a first-order derivative vector equation controlling a direction of the curve are:

$$\begin{cases} C_0 = V_0 \\ -C_0 + C_1 = \frac{u_4}{3}F_0 \\ -C_{n+1} + C_{n+2} = \frac{1-u_{n+2}}{3}F_n \\ C_{n+2} = V_n \end{cases},$$

except for the endpoints, a repeatability of each internal node is 1, and at most three non-zero basis functions are provided for node $u_j$; and n−1 equations excluding the endpoints are:

$$V_k = N_{k,3}(\overline{u}_k)C_k + N_{k+1,3}(\overline{u}_k)C_{k+1} + N_{k+2,3}(\overline{u}_k)C_{k+2},$$

where k=1, 2, . . . , n−1, $a_k$=$N_{k,3}(\overline{u}_k)$, $a_k$=$N_{k,3}(\overline{u}_k)$, $a_k$=$N_{k,3}(\overline{u}_k)$ and a linear equation set with a coefficient of (n−1)×(n−1) is calculated as follows:

$$\begin{bmatrix} V_1 - a_1C_1 \\ V_2 \\ \vdots \\ V_{n-2} \\ V_{n-1} - c_{n-1}C_{n-1} \end{bmatrix} = \begin{bmatrix} b_1 & c_1 & 0 & \cdots & 0 & 0 & 0 \\ a_2 & b_2 & c_2 & \cdots & 0 & 0 & 0 \\ \vdots & \vdots & \vdots & & \vdots & \vdots & :0 \\ 0 & 0 & 0 & \cdots & a_{n-2} & b_{n-2} & c_{n-2} \\ 0 & 0 & 0 & \cdots & 0 & a_{n-1} & b_{n-1} \end{bmatrix} \begin{bmatrix} C_2 \\ C_3 \\ \vdots \\ C_{n-1} \\ C_n \end{bmatrix}.$$

At step S4, an angle of a worktable 7 of the 840D numerical control system is adjusted based on a formation direction of each feature of the model to reduce or avoid the use of a support structure.

Referring to FIGS. 3A-3B and 6A-6B, the angle of the worktable 7 is adjusted by the fifth motor 5. When an axis of a solid model after feature decomposition is a straight line illustrated in FIG. 6A, slicing is performed along the axis of each feature during a slicing process; and after one feature is completed, the fifth motor is rotated by 90° (an angle between axes of two features) for formation of a next feature.

Figure 6A:
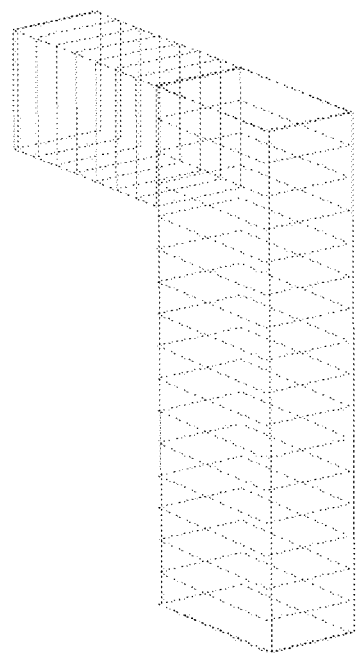
FIGS. 6A and 6B illustrates a model feature classification, where
Figure 6B:
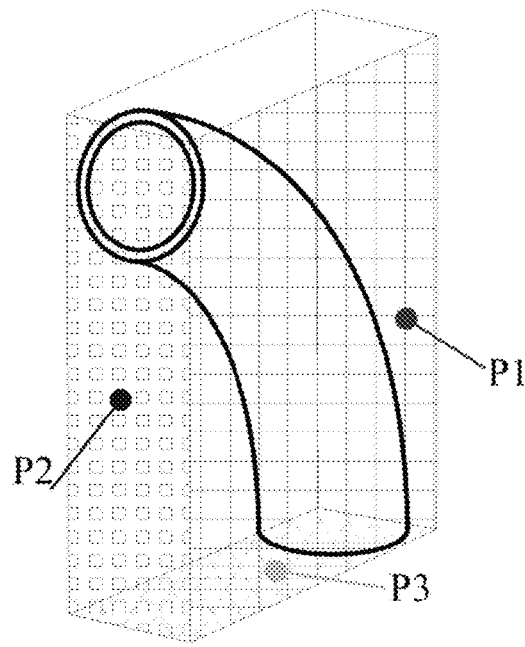

When the axis of the model after feature decomposition is a curve as illustrated in FIG. 6B, the model is rotated 180 times by 180 degrees in an increment of δ=1°, and a minimum bounding box is calculated for each time. A position with a smallest box volume is the best placement position for the model. A surface P3 with a smallest area in the bounding box is used as an initial slicing surface, taking a longest side as a slicing direction and a surface with a largest area as a test slicing plane P1.

Figure 7:
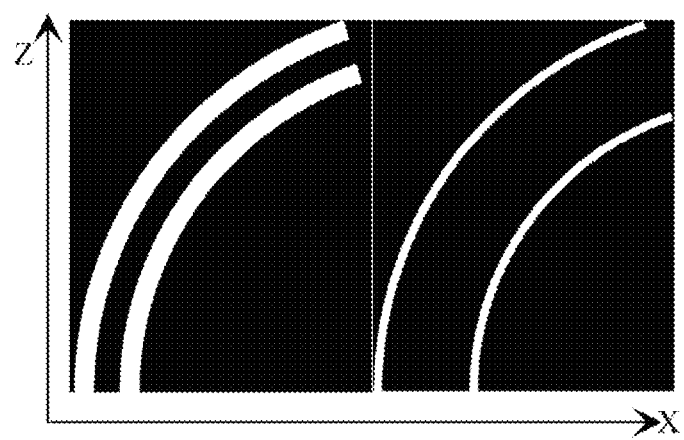
FIG. 7 illustrates a test cross-sectional profile.

A curvature change of a slice contour obtained by cutting the model along P1 is used as an adjustment basis for a change of the slicing direction as illustrated in FIG. 7. During the slicing process, an angle θ between a slope of the curve and a Z axis in FIG. 7 is calculated based on a set slice thickness. The model is cut along the slicing direction after being rotated to the angle θ each time.

During the formation process, the motor 5 is rotated by a corresponding angle based on the angle θ corresponding to each layer, so as to always ensure that the formation plane is in an absolute horizontal position and avoid the use of the support structure.

At step S5, a first motor 1, a third motor 3 and a fifth motor 5 are linked to complete spatial curve formation, a quick response is made to setting of dry elongation, and a distance between a formation plane and an electron gun is dynamically adjusted.

Figures 3A, 3B:
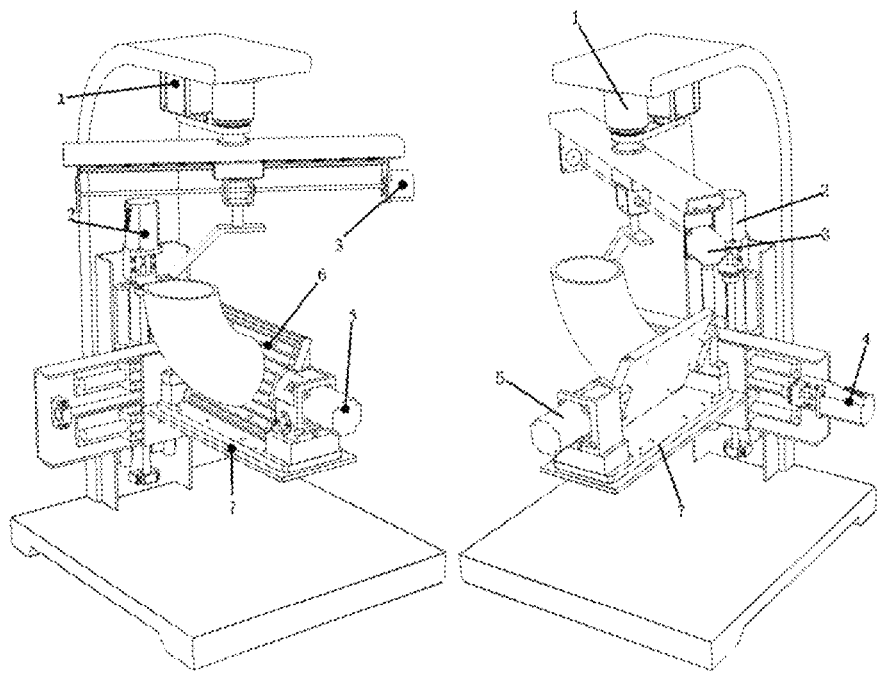

Referring to FIGS. 3A and 3B, the first motor 1 drives a beam to rotate through a pulley; the third motor 3 drives the electron gun to reciprocate through a screw nut pair, and the entire component (the third motor 3, the screw nut pair and the electron gun) are fixed on the beam and may rotate with the beam. A motor 2 controls the formation plane to move up and down along the Z direction. A motor 4 controls the formation plane to move in the Y direction, and the fifth motor 5 controls the formation plane to rotate in the W direction.

Movement relation is that the first motor 1 and the third motor 3 are linked to achieve a two-dimensional spiral; the first motor 1, the second motor 2 and the third motor 3 are linked to achieve a three-dimensional spiral; the beam rotates to be parallel to the Y axis, then the second motor 2, the third motor 3, the fourth motor 4 and the fifth motor 5 form a traditional Cartesian coordinate system, which achieves three-axis semi-linkage.

The first motor 1 is used to control A first rotating shaft. When processing a complete circle, it is only needed to rotate the first motor 1 by one circle to finish, and there is no need for a multi-axis linkage. The first motor 1 and the third motor 3 may cooperate to form an Archimedes spiral, which approximates the curve profile in this way.

The second motor 2 is used to control the Z axis, and the third motor 3 is used to control the X axis. A specific direction is determined by the first motor 1, not completely along the X axis. The fourth motor 4 is used to control the Y axis. The motor 5 is arranged on the worktable 7 and is used to control a second rotating shaft to drive a turntable 6 to rotate.

The first motor moves by rotating and a second motor moves in a straight line to work in cooperation with each other, to form a straight line, a full circle, an arc and an Archimedes spiral in the plane, for use in contour approximation fitting, island profile filling, full circle formation, straight line formation, arc formation during curve formation. A response speed of the numerical control system to 3D printing data is improved within an allowable range of accuracy.

Figure 4:
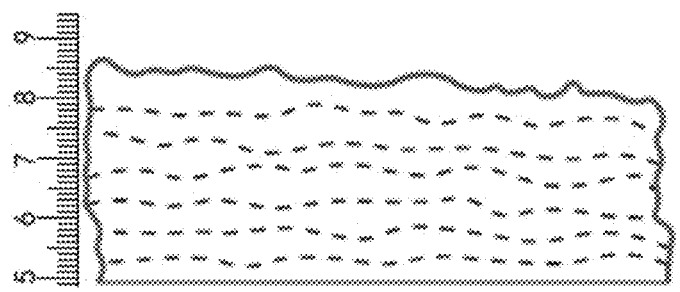
FIG. 4 is a schematic diagram of a dynamic adjustment of a distance of an electron gun.

In variable-direction formation, the fifth motor 5 gradually rotates following a change of a curvature, in such a manner that a formation plane is always parallel to the worktable. When an actual formation surface has a contour having ups and downs as illustrated in FIG. 4, the fifth motor 5 is configured to swing left and right in accordance with fed back data on a position of the electron gun, in such a manner that a distance between the electron gun and a workpiece is stable at all times. In such a process, the fifth motor 5, the first motor 1 and the third motor 3 move in cooperation with each other to form a spatial curve, which changes following a contour of a surface of a molten pool.

In order to make objectives, technical solutions, and advantages of the embodiments of the present disclosure clearer, the technical solutions in the embodiments of the present disclosure will be described clearly and completely in conjunction with the accompanying drawings in the embodiments of the present disclosure. Obviously, the described embodiments are a part of the embodiments of the present disclosure, not all the embodiments. The components of the embodiments of the present disclosure generally described and shown in the drawings herein can be arranged and designed in various configurations. Therefore, the following detailed description of the embodiments of the present disclosure provided in the accompanying drawings is not intended to limit the scope of the claimed present disclosure, but merely represents selected embodiments of the present disclosure. Based on the embodiments of the present disclosure, all other embodiments obtained by those of ordinary skill in the art without creative work shall fall within the protection scope of the present disclosure.

Referring to FIGS. 5A and 5B, the STL file is used as an only input model to generate data information with .out as a suffix, for use in generating a later numerical control machining code.

The linear and spline basis functions are used to perform the quadratic fitting on the contour coordinates. The NURBS curve may approach a blue section line in a form of convex or concave contour according to an extension trend of the original data, and restore the original data. A centroid of a graph envelope rectangle is taken as a pole, the pole increment is set as $\Delta\theta=\pi/360$, polar diameters of the three curves are calculated, and an error distribution of the fitted data and the original data and an error distribution of the slice data and the original data are obtained respectively. An error range between the slice data and the original data is [−0.22, 0.2343], and the error range between the fitted data and the original data is [0.1381, −0.1609], and the error is reduced by 29.9%.

The above content is only to illustrate the technical idea of the present disclosure and cannot be used to limit the scope of protection of the present disclosure. Any changes made on the basis of the technical solutions based on the technical idea proposed by the present disclosure fall within the protection scope of the claims of the present disclosure.

What is claimed is:

1. An electron beam manufacturing (EBM) variable-direction formation dynamic slicing method in cooperation with a numerical control system, comprising:

step S1: loading an STL file, creating a vertex array object (VAO), turning on a template buffer, adjusting a projection matrix to a slice height in rendering of a three-dimensional (3D) model, traversing all pixels in a field of view sequentially by determining an intersection between a viewpoint and a voxel using a reverse ray tracing algorithm, reading image data from pixels at a set height, and outputting a binary image of a two-dimensional cross-section;

step S2: obtaining, by means of two-dimensional contour extraction, data of a contour line from the binary image obtained in the step S1, outputting coordinates of a closed contour, and connecting all adjacent coordinates into a straight line in such a manner that respective straight lines are connected end to end to form a closed curve; and step S3: when a triangle tolerance is 1, dividing contour data into a straight line part and a curve part by taking a starting point of small straight lines with an angle of 140° therebetween as a dividing point, removing adjacent points, repeated points and internal points of a same straight line, and performing segmentation fitting on curve parts of the slice data by using a NURBS curve, and then performing dynamic slicing through the numerical control system, wherein after the fitting in the step S3 is completed, an angle of a worktable of the numerical control system is adjusted based on a formation direction of each feature of the model; a first motor, a third motor and a fifth motor of the numerical control system are linked to complete spatial curve formation; the first motor moves by rotating and a second motor of the numerical control system moves in a straight line to work in cooperation with each other, to form a straight line, a full circle, an arc and an Archimedes spiral in the plane, for use in contour approximation fitting, island profile filling, full circle formation, straight line formation, arc formation during curve formation; and a quick response is made to a setting of dry elongation, a distance between a formation plane and an electron gun is dynamically adjusted, the slicing is performed.

2. The EBM variable-direction formation dynamic slicing method in cooperation with the numerical control system according to claim 1, wherein the step S1 comprises: determining whether a ray directed to a pixel from the viewpoint intersects with a 3D grid based on a positional relation between an STL grid and any coordinate point x in space, a ray r(d) emitted from a camera position and a plane equation of any triangle grid in space, and traversing all pixels in the field of view sequentially to obtain the binary image of the 3D model at a specified height.

3. The EBM variable-direction formation dynamic slicing method in cooperation with the numerical control system according to claim 2, wherein, when using the reverse ray tracing algorithm, the positional relation between the STL grid and any coordinate point x in space is expressed as:

$$f(x) = \begin{cases} -1 & \text{the coordinate point is outside the model} \\ 0 & \text{the coordinate point is on the model} \\ 1 & \text{the coordinate point is inside the model} \end{cases};$$

the ray r (d) emitted from the camera position is:

$r(d)=c+dn,$ where d>0, d denotes a ray distance, and denotes coordinates of the camera position; and the plane equation of any triangle grid in space is:

$[r(d)-o]\cdot N=0,$ where o denotes coordinates of the triangle grid, and N is a normal vector of the triangle grid.

4. The EBM variable-direction formation dynamic slicing method in cooperation with the numerical control system according to claim 1, wherein the step S1 comprises: performing 3D slicing by using the template buffer, and rendering the model three times by means of ray tracing, including: adding one to a value of f(x) when an external grid is encountered, subtracting one from the value of f(x) when an internal grid is encountered, and deleting an area with a value of 0 in a buffer.

5. The EBM variable-direction formation dynamic slicing method in cooperation with the numerical control system according to claim 1, wherein, in the step S2, the contour extraction comprises:

step S201: storing coordinates and marks of a position into a specific array;

step S202: extracting a block from the grid as a currently active block and obtaining coordinates and bump information of four grid points; and step S203: setting adjacent coordinates after searching as $p_1(x_1, y_1)$ and $p_2(x_2, y_2)$, performing an interpolation correction on a sequence of coordinates with a midpoint as an intersection point to obtain an interpolation point $p(x, y)$, and completing the contour extraction.

6. The EBM variable-direction formation dynamic slicing method in cooperation with the numerical control system according to claim 5, wherein the interpolation point $$y = y_1 + \frac{y_2 - y_1}{x_2 - x_1}(x - x_1).$$

7. The EBM variable-direction formation dynamic slicing method in cooperation with the numerical control system according to claim 1, wherein, in the step S3, a BSPLINE interpolation function of the numerical control system smoothly connect scattered coordinate points through control points and weight factors, and a linear velocity is always constant during a formation process, contour coordinate points generated by the slicing are set as $\{V_k\}$, $k=0, 1, \ldots, n$, a node vector $U=\{u_0, u_1, \ldots, u_m\}$, a node corresponding to any coordinate point $V_k$ is $\bar{u}_k$, $n+1$ linear equations are constructed according to n coordinate points; data points are parameterized with centripetal parameterization method; fitting is performed by using a cubic spline curve.

8. The EBM variable-direction formation dynamic slicing method in cooperation with the numerical control system according to claim 7, wherein the n+1 linear equations are as follows:

$$V_k = S(\bar{u}_k) = \sum_{i=0}^{n} N_{i,p}(\bar{u}_k) C_i,$$

where the control point $C_i$ is a quantity to be determined, $N_{i,p}$ represents a primary function of the NURBS curve at an $i_{th}$ coordinate, p represents an order of the primary function, and the node value $\bar{u}_k$ is within $[0,1]$;

the data points are parameterized as:

$$\bar{u}_k = \bar{u}_{k-1} + \frac{\sqrt{|V_k - V_{k-1}|}}{\sum_{k=1}^{n}\sqrt{|V_k - V_{k-1}|}},$$

where $k=1, 2, \ldots, n-1$, $\bar{u}_0=0$, and $\bar{u}_n=0$;

in order to ensure that tangents of curves on both sides of the dividing point are collinear, first-order derivative vectors at endpoints are respectively set as $F_0$ and $F_n$, and a repeatability of the curve at the endpoints is 3:

$$u_{j+d} = \bar{u}_j,$$

where $j=1, 2, \ldots, n-p$, $\bar{u}_0 = \ldots = \bar{u}_3 = 0$, and $\bar{u}_{n+1} = \ldots = \bar{u}_{n+6} = 1$;

an equation of endpoints of the curve and a first-order derivative vector equation controlling a direction of the curve are:

$$\begin{cases} C_0 = V_0 \\ -C_0 + C_1 = \frac{u_4}{3} F_0 \\ -C_{n+1} + C_{n+2} = \frac{1 - u_{n+2}}{3} F_n \\ C_{n+2} = V_n \end{cases},$$

except for the endpoints, a repeatability of each internal node is 1, and at most three non-zero basis functions are provided for node $u_j$; and n−1 equations excluding the endpoints are:

$$V_k = N_{k,3}(\bar{u}_k) C_k + N_{k+1,3}(\bar{u}_k) C_{k+1} + N_{k+2,3}(\bar{u}_k) C_{k+2},$$

where $a_k = N_{k,3}(\bar{u}_k)$, $b_k = N_{k+1,2}(\bar{u}_k)$, $c_k = N_{k+2,3}(\bar{u}_k)$, $N_{k,3}$, $N_{k+1,3}$, $N_{k+2,3}$ represent the primary function of the NURBS curve at a kth coordinate, a $k+1_{th}$ coordinate, and a $k+2_{th}$ coordinate, respectively, the primary function has an order of 3, and a linear equation set with a coefficient of (n−1)×(n−1) is calculated as follows:

$$\begin{bmatrix} V_1 - a_1 C_1 \\ V_2 \\ \vdots \\ V_{n-2} \\ V_{n-1} - c_{n-1} C_{n-1} \end{bmatrix} = \begin{bmatrix} b_1 & c_1 & 0 & \ldots & 0 & 0 & 0 \\ a_2 & b_2 & c_2 & \ldots & 0 & 0 & 0 \\ \vdots & \vdots & \vdots & & \vdots & \vdots & \vdots 0 \\ 0 & 0 & 0 & \ldots & a_{n-2} & b_{n-2} & c_{n-2} \\ 0 & 0 & 0 & \ldots & 0 & a_{n-1} & b_{n-1} \end{bmatrix} \begin{bmatrix} C_2 \\ C_3 \\ \vdots \\ C_{n-1} \\ C_n \end{bmatrix}.$$

9. The EBM variable-direction formation dynamic slicing method in cooperation with the numerical control system according to claim 1, wherein, when an axis of a solid model after feature decomposition is a straight line, slicing is performed along the axis of each feature during a slicing process; after slicing in a direction of one feature is completed, the fifth motor is rotated by 90° for formation of a next feature; when the axis of the model after feature decomposition is a curve, the model is rotated 180 times by 180 degrees in an increment of $\delta=1°$, and a minimum bounding box is calculated for each time; a position with a smallest box volume is the best placement position for the model; a surface P3 with a smallest area in the bounding box is used as an initial slicing surface, taking a longest side as a slicing direction and a surface with a largest area as a test slicing plane P1; a curvature change of a slice contour obtained by cutting the model along P1 is used as an adjustment basis for a change of the slicing direction; during the slicing process, an angle θ between a slope of the curve and a Z axis is calculated based on a set slice thickness; and the model is cut along the slicing direction after being rotated to the angle θ each time;

in variable-direction formation, the fifth motor gradually rotates following a change of a curvature, in such a manner that a formation plane is always parallel to the worktable; when an actual formation surface has a contour having ups and downs, the fifth motor is configured to swing left and right in accordance with fed back data on a position of the electron gun, in such a manner that a distance between the electron gun and a workpiece is stable at all times; and then, the fifth motor, the first motor and the third motor move in cooperation with each other to form a spatial curve, which changes following a contour of a surface of a molten pool.

* * * * *